United States Patent
Kumar et al.

(10) Patent No.: US 11,892,917 B2
(45) Date of Patent: Feb. 6, 2024

(54) APPLICATION RECOVERY CONFIGURATION VALIDATION

(71) Applicant: Rubrik, Inc., Palo Alto, CA (US)

(72) Inventors: Abhishek Kumar, San Jose, CA (US); Shaomin Chen, San Jose, CA (US); Harmeet Kaur, Santa Clara, CA (US); Muraliraja Muniraju, Fremont, CA (US); Angela Huang, San Francisco, CA (US); Hongbo Zou, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 134 days.

(21) Appl. No.: 17/696,678

(22) Filed: Mar. 16, 2022

(65) Prior Publication Data
US 2023/0297495 A1 Sep. 21, 2023

(51) Int. Cl.
*G06F 11/20* (2006.01)
*G06F 11/14* (2006.01)
*G06F 9/455* (2018.01)

(52) U.S. Cl.
CPC ...... *G06F 11/2023* (2013.01); *G06F 11/1417* (2013.01); *G06F 9/45558* (2013.01); *G06F 2009/4557* (2013.01); *G06F 2009/45562* (2013.01); *G06F 2009/45591* (2013.01)

(58) Field of Classification Search
CPC .......... G06F 9/45558; G06F 11/1417; G06F 11/2023; G06F 2009/45562; G06F 2009/4557; G06F 2009/45591
See application file for complete search history.

(56) References Cited

U.S. PATENT DOCUMENTS

| 9,792,187 B2 * | 10/2017 | Mutalik | G06F 11/203 |
| 2020/0334043 A1 * | 10/2020 | Zlotnick | G06F 11/1469 |
| 2021/0004292 A1 * | 1/2021 | Zlotnick | G06F 9/4416 |
| 2021/0382771 A1 * | 12/2021 | Schniebel | G06F 11/0772 |

FOREIGN PATENT DOCUMENTS

WO WO-2022013851 A1 * 1/2022

* cited by examiner

*Primary Examiner* — Joseph R Kudirka
(74) *Attorney, Agent, or Firm* — Holland & Hart LLP

(57) ABSTRACT

A storage appliance may be configured to perform a method to evaluate a failover procedure. The method may include receiving a trigger indication to perform a test failover procedure for a plurality of virtual machines and identifying, based on receiving the trigger indication, a set of procedures for performing a full failover procedure on a target system based at least in part on a recovery configuration for the plurality of virtual machines. The method may include selecting a subset of test procedures of the set of procedures, causing execution on the target system of the subset of test procedures on a subset of virtual machines of the plurality of virtual machines, and calculating, based at least in part on the execution of the subset of test procedures on the subset of virtual machines, a success metric associated with the full failover procedure for the plurality of virtual machines.

20 Claims, 11 Drawing Sheets

APPLICATION RECOVERY CONFIGURATION VALIDATION

FIELD OF TECHNOLOGY

The present disclosure relates generally to database systems and data processing, and more specifically to application recovery configuration validation.

BACKGROUND

A computing system may be employed to manage, process, backup, and restore data using a network of computing devices.

Some data management systems may utilize virtual machines to support data management at a plurality of storage devices. In some examples, a data management system may periodically generate snapshots of a virtual machine, and the snapshot may represent a current state of the virtual machine. If a virtual machine fails, a failover procedure may be used to replicate the virtual machine using a snapshot. In some cases, it may be desirable to test a failover procedure in a manner that efficiently uses limited computing resources.

DETAILED DESCRIPTION

Figure 1:
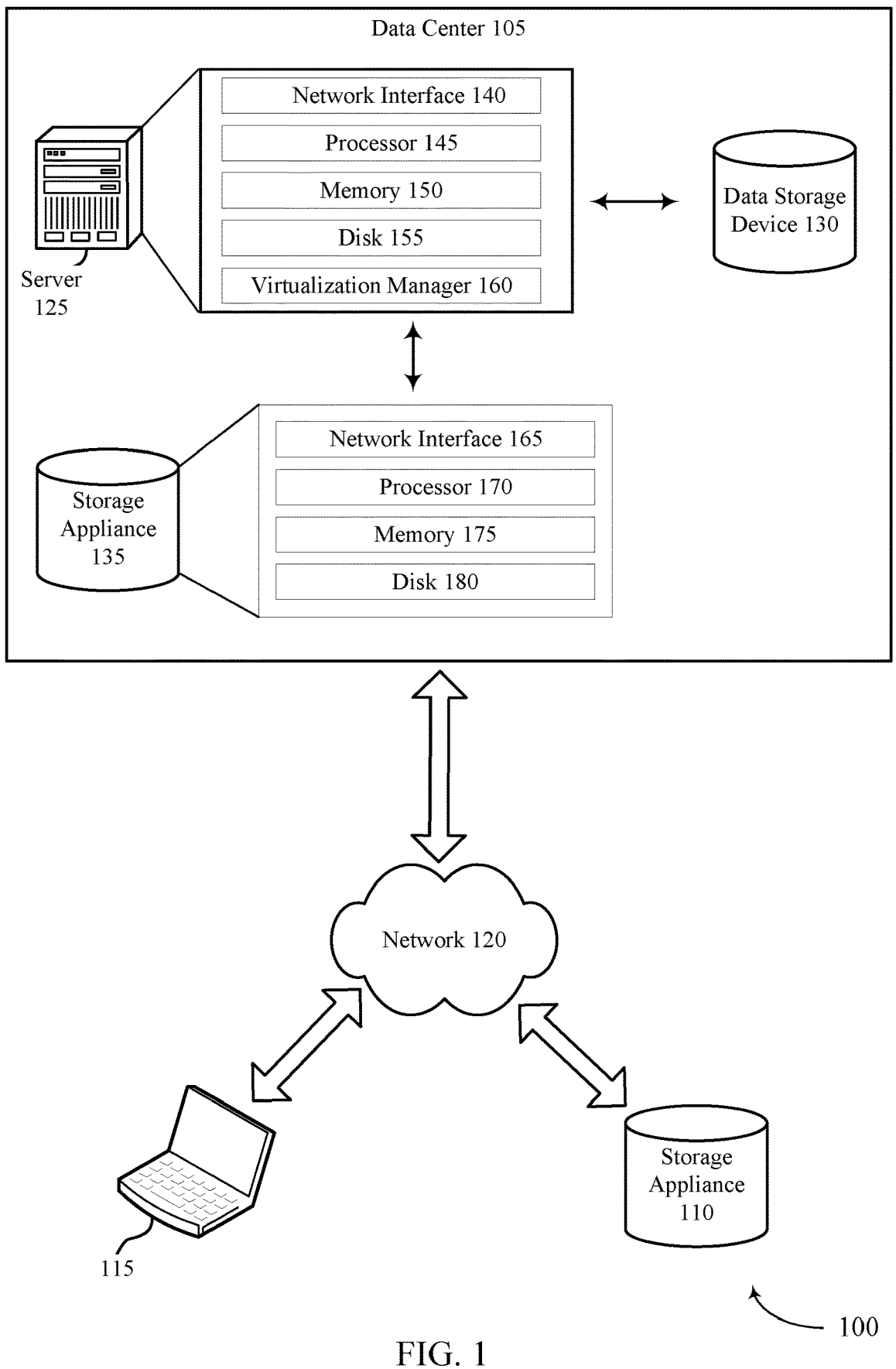
FIG. 1 illustrates an example of a computing environment that supports application recovery configuration validation in accordance with aspects of the present disclosure.

Some computing systems may utilize virtual machines to support application execution and management of data associated with the applications. For example, the virtual machines may support a webserver, a database server, or logic for other types of services. The virtual machine may virtualize a set of physical computing systems (e.g., data storage devices) in order to manage data storage, processing, and retrieval for application support. In some examples, these computing systems may periodically generate snapshots of a virtual machine, and the snapshot may represent a current state of the virtual machine. If a virtual machine fails, a failover procedure may be used to replicate the virtual machine on another device using a snapshot.

In some examples, a set of virtual machines may be used to support application execution and management. In such cases, a recovery configuration may be maintained for the set of virtual machines. The recovery configuration may identify the grouping of virtual machines (e.g., a group associated with an application or set of applications), a boot order for booting the virtual machines, a mapping for resources (e.g., network computing, storage, postscript), optimization configurations, and the like. A user or organization may periodically test a failover procedure in which the full failover procedure is performed according to the recovery configuration, except for taking the source virtual machines offline. A test failover may be performed in order to determine that the target system and configurations and topology are functioning properly and are compliant with the recovery configuration. Thus, a test failover may give an entity (e.g., organization) confidence that the backup and recovery systems are functional. However, performing a full failover procedure (e.g., for a test) may utilize significant processing resources and bandwidth at a source system and/or a target system. Thus, it may be desirable to test a subset of the failover procedure in a manner that reduces resource usage but provides confidence that the backup and recovery procedures are functioning properly.

Implementations described herein support identification of a set of procedures for a full failover procedure and selecting a subset of such procedures for a test failover. Further, the subset of procedures may be performed for a subset of virtual machines that are grouped according to the recovery configuration. Thus, the subset of test procedures, which may include testing network configurations on a target system and testing storage capacity on the target system, may be performed for one of the virtual machines of a plurality of virtual machines that may be recovered according to a full recovery procedure. A success metric may be calculated based on execution of the subset of test procedures at the target system. The success metric may be used to give an entity confidence that the backup and recovery procedures are functioning properly (or not) without having to use resources required to perform a full failover procedure. These and other implementations are further described with respect to the figures.

Aspects of the disclosure are initially described in the context of an environment supporting data backup and recovery. Aspects of the disclosure are further described with a server, storage appliance, computing environment, and a process flow that support data backup and recovery using the failover validation techniques described herein. Aspects of the disclosure are further illustrated by and described with reference to apparatus diagrams, system diagrams, and flowcharts that relate to application recovery configuration validation.

FIG. 1 illustrates an example of a computing environment 100 for cloud computing that supports application recovery configuration validation in accordance with various aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure. The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network Attached Storage (NAS) device. In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 may include a network interface 165, processor 170, memory 175, and disk 180 in communication with each other. Network interface 165 may support communication of storage appliance 135 with one or more networks. Network interface 165 may include a wireless network interface and/or a wired network interface. Processor 170 may support storage appliance in execution of computer-readable instructions stored in memory 175 to perform operations described herein. Processor 170 may include one or more processing units, such as one or more central processing units (CPUs) and/or one or more graphics processing units (GPUs). Memory 175 may comprise one or more types of memory as described with respect to memory 150. Disk 180 may include a hard disk drive and/or a solid-state drive. Memory 175 and disk 180 may comprise hardware storage devices.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

As described herein, the storage appliance 135 may support virtual machine backup and recovery. To support object backup and replication, periodic snapshots of an object may be generated and stored to the storage appliance 135 or another location. The snapshots may be generated according to a schedule set forth in a service level agreement, which may be configurable at the storage appliance 135. The snapshots may be stored for a period of time and used for replication during failure of a device that supports the object. For example, during a failover recovery procedure resulting from device failure, a snapshot may be used to replicate the virtual machine at a new device/system in the state captured by the snapshot.

As described herein, the storage appliance 135 may maintain a recovery configuration that is used to perform the failover procedure. The recovery procedure may specify a set of virtual machines and a boot order for the set of virtual machines, wherein the boot order is to be executed to recovery the virtual machines correctly. For example, a set of virtual machines may support one or more applications, such as a web server, an application server, and/or a database server for an entity. If one or more of the virtual machines fails or a device supporting the virtual machines fails, the virtual machines support the one or more applications are to be recovered and booted according to the boot order specified in the recovery configuration to function properly.

The storage appliance 135 may support a full test failover procedure in which the virtual machines specified in the recovery configuration are booted according to the boot order and other procedures for failover are performed. During a test failover procedure, the virtual machines are essentially brought fully online, but the source virtual machines (e.g., the virtual machines that are being "recovered") are not taken offline. Performing a test failover procedure including booting the virtual machines according to the boot order specified in the recovery configuration may utilize significant processing resources at the source system, the target system, or both.

Implementations described herein support performing a test failover procedure without performing each procedure of a full failover. The test failover procedure may result in a success metric that may be relied upon by an entity to determine whether the backup and recovery procedures are functioning properly. To support the test failover procedure, the storage appliance 135 (or an associated system) may identify a set of test procedures for performing a full failover procedure on a target system and select a subset of such procedures based on metadata associated with the virtual machines. The selected subset of test procedures may include testing one or more network configurations and testing a storage capacity of the target system. The selected subset may be executed on the target system and the success metric may be calculated based on execution of the selected subset.

It should be appreciated by a person skilled in the art that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
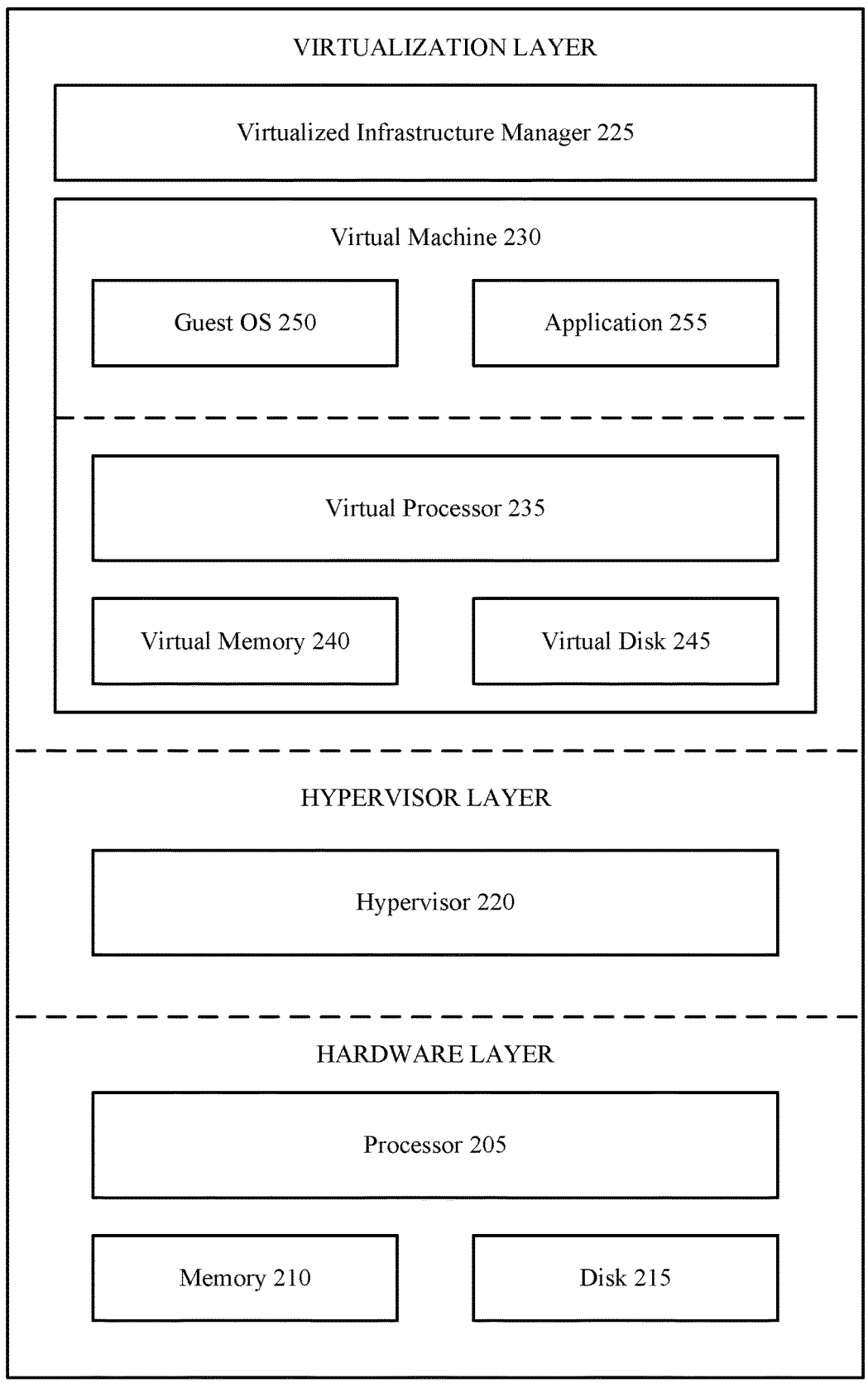
FIG. 2 illustrates an example of a server that supports application recovery configuration validation in accordance with aspects of the present disclosure.

FIG. 2 illustrates an example of a server 200 that supports application recovery configuration validation in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more disks 245. In one example, a virtual machine 230 may include a plurality of virtual disks 245, with each virtual disk of the plurality of virtual disks 245 associated with a different file stored on the one or more disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

As described herein, the server 200, a storage appliance, and/or an associated system may support backup and recovery for one or more virtual machines that support an application, such as virtual machine 230. For example, a storage appliance may receive periodic backups of the virtual machine 230. The storage appliance may securely store the periodic backups for subsequent use for recovery of the virtual machine 230 upon failure of the virtual machine 230, the server 200, or another component of the server 200. The virtual machine 230 may be recovered on the server 200 or another system (e.g., a target system). The server 200 and/or the storage appliance may support periodic testing of a failover recovery procedure to determine that the backup and recovery procedures are functioning properly. However, running the failover procedure may come with resource overhead, as the failover procedure may require booting of each virtual machine that supports an application as well as movement of data to the booted virtual machines.

Implementations described herein support performing a test failover procedure without performing each procedure required to perform a full failover procedure. A system, such as a storage appliance, may identify a set of procedures that is required to perform a full failover procedure, and select a subset of such procedures for the test failover procedure. The system may also execute the selected subset of test procedures for a subset of virtual machines that are associated according to a recovery configurations. For examples, a plurality of virtual machines may be required to perform a full recovery of an application, but the techniques described herein preform the selected subset of test procedures on a subset of the plurality of virtual machines. The selected subset of test procedures may be executed on a target system (e.g., another server), a success metric may be generated. The success metric may indicate the likelihood that a full failover procedure would be successful.

Figure 3:
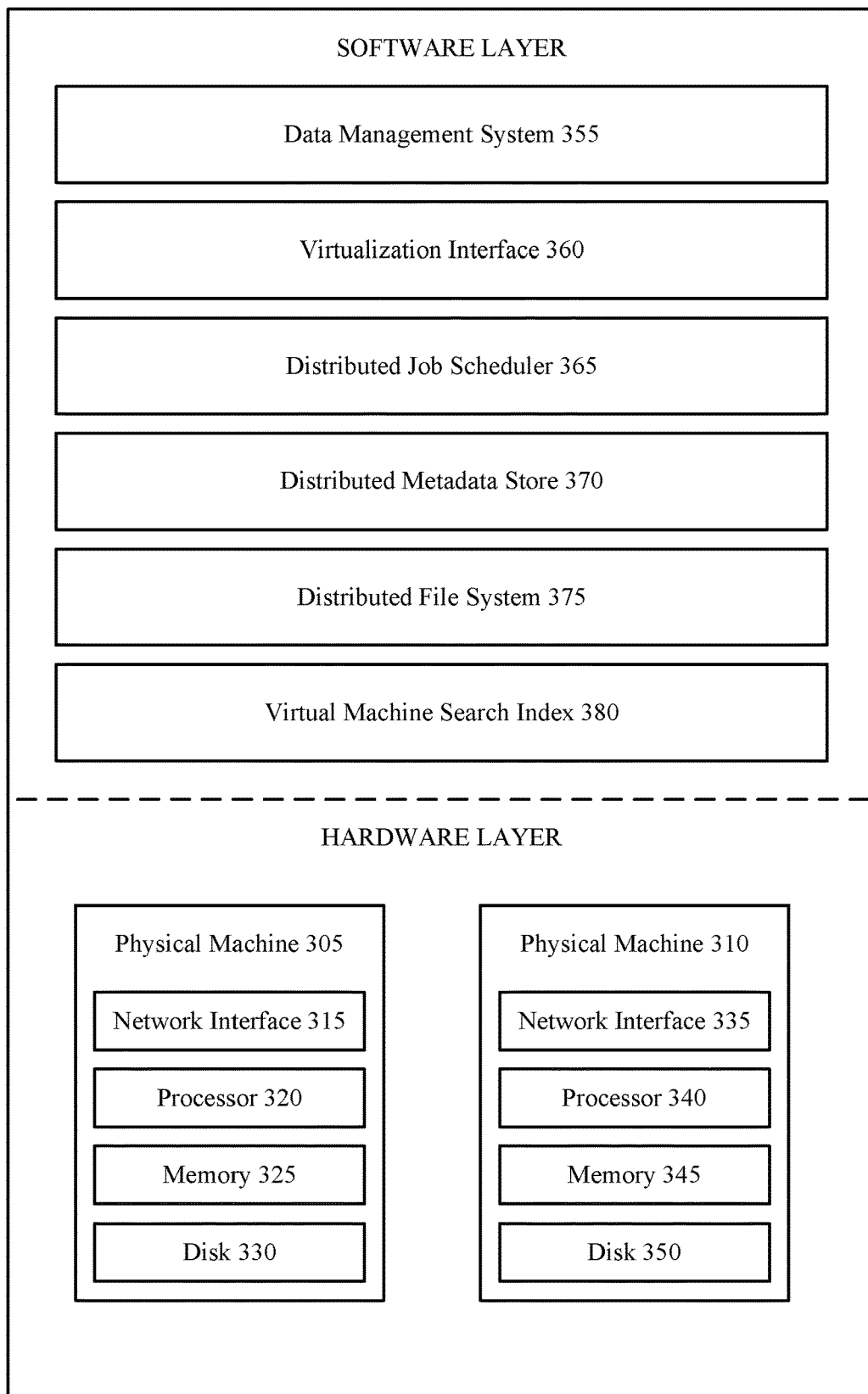
FIG. 3 illustrates an example of a storage appliance that supports application recovery configuration validation in accordance with aspects of the present disclosure.

FIG. 3 illustrates an example of a storage appliance 300 that supports application recovery configuration validation in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G-i modulo N. In another example, given a number (N) of nodes in a cluster from node(0) to node(N−1), for a floating IP address (i), the VRRP priority of node G may be (i-j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

The storage appliance 300 may support data object backup and recovery procedures for other systems (e.g., a server 200 of FIG. 2). The storage appliance 300 may periodically generate or receive snapshots associated with virtual machines of another system, and the snapshots may be used to subsequently recover the virtual machines of the other system. As described herein, the storage appliance 300 may store the snapshots in a snapshot storage location. The storage appliance 300 may further support periodic testing of backup recovery procedures via a test failover procedure.

To perform a test failover procedure, one or more snapshots associated with a source system (e.g., a system supporting a set of source virtual machines) may be used to boot and instantiate the virtual machines in a target system. The test failover procedure may include a set of procedures that are performed for the failover. However, execution of each procedure of the set of procedures may result in significant resource overhead, such as processing, memory, and bandwidth.

Implementations described herein support the virtual machine performing a test failover procedure using a subset of the test procedures as well as for a subset of virtual machines that support an application. The storage appliance 300 may be configured to periodically preform the test failover procedure using a subset or may receive an indication (e.g., a trigger indication) to perform the failover procedure. In some examples, the trigger indication may be received via a user activating a user interface component at a user interface supported by or associated with the storage appliance 300. Upon receiving the trigger indication, the storage appliance 300 may select the subset of test procedures. The selection may be based on metadata associated with a recovery configuration for a plurality of virtual machines that support an application. The selected subset may include testing one or more network configurations for a target system or testing a storage capacity of the target system. The storage appliance may calculate a success metric associated with the full failover procedure based on execution of the subset of test procedures on a subset of the virtual machines.

Figure 4:
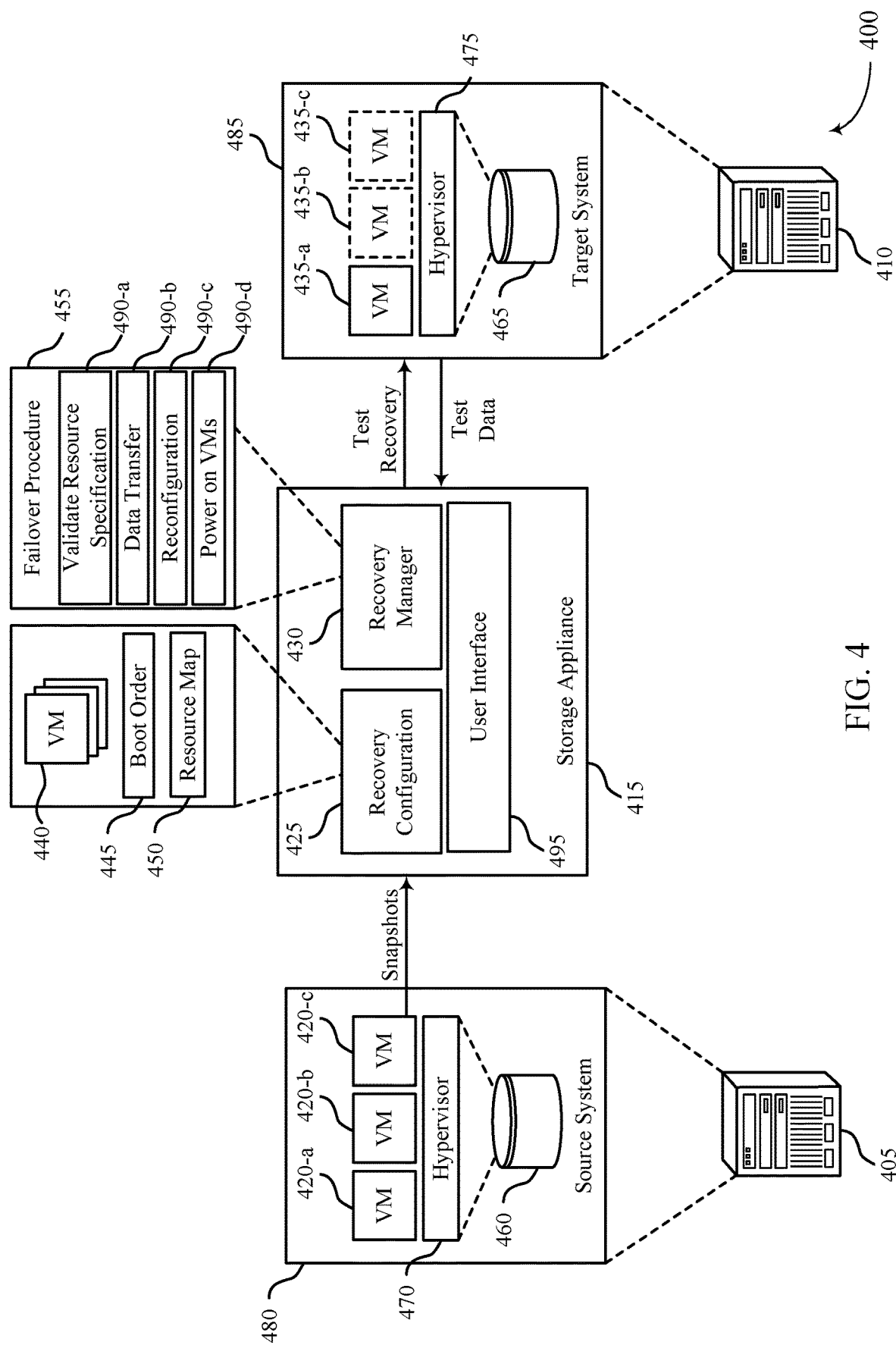
FIG. 4 illustrates an example of a computing system that supports application recovery configuration validation in accordance with aspects of the present disclosure.

FIG. 4 illustrates an example of a computing system 400 that supports application recovery configuration validation in accordance with aspects of the present disclosure. The computing system 400 includes a server 405, a server 410, and a storage appliance 415, which may be examples of the corresponding devices described with respect to FIGS. 1 through 3. The server 405 may support a source system 480 that includes a storage device 460, which may represent a data storage device (e.g., a disk), memory, and the like, as described with respect to FIG. 1. The source system 480 may also support and execute a hypervisor 470 that supports a set of virtual machines (VMs) 420. The virtual machines 420 may support execution of one or more applications, such as a web server, application server, and a database server. The one or more applications may be used to support services for an entity, such as an organization, and the services may include web services, enterprise services, and the like.

The source system 480 may be configured to generate periodic snapshots of the virtual machines 420 to support backup and recovery. The snapshots may represent the current state of a virtual machine and may be examples of full data images or incremental images, as described herein. The snapshots may be managed by the storage appliance 415. The storage appliance 415 may be supported by server 405, server 410, or both, and/or by a separate computing system. The storage appliance 415 may be used to maintain, organize, configure, and otherwise support backup and recovery of one or more source systems (e.g., source system 480) and one or more target systems (e.g., a target system 485 of server 410). In some examples, the storage appliance 415 may be interfaced with a separate storage system (e.g., a cloud storage system) where data images associated with snapshots are stored or replicated.

As described herein, the storage appliance 415 may be used for data backup and recovery of the source system 480. For example, upon failure of the server 405, the source system 480, or an associated component, the storage appliance 415 may be used to recover the virtual machines 420 on the target system 485 as virtual machines 435 using the snapshots. Thus, the virtual machines 435 may be recovered to support the applications for the entity or organization. The virtual machines 435 may be recovered using a recovery manager 430 that implements a failover procedure 455 that sets forth a set of set of procedures 490 for performing a full failover procedure. The set of procedures 490 may include a resource validation procedure 490-a, a data transfer procedure 490-b, reconfiguration procedure 490-c, and a power on procedure 490-d, among other procedures.

Additionally, the storage appliance 415 may maintain a recovery configuration 425 for recovering the virtual machines. The recovery configuration 425 may define a group of virtual machines 440 that are part of the same business service or application. For example, group of virtual machines 440 may correspond to virtual machines 420. Each virtual machine within the recovery configuration 425 may be backed up according to a service level agreement assignment that includes replication topology and backup frequency to support data movement to an alternate site (e.g., the target system 485). The recovery configuration 425 may set forth a resource map that includes a target compute, storage, and network for each virtual machine of the group of virtual machines 440. The resource maps may be monitored (e.g., by storage appliance 415) for alignment with virtualization infrastructure. The recovery configuration 425 may also define one or more boot order groups that are used to ensure that each virtual machine is started in an order for implementing an application that the virtual machines support. Further, the recovery configuration 425 may define one or more post-scripts that may be defined for each virtual machine of the group of virtual machines 440 and executed during the recovery procedure.

As described herein, the storage appliance 415 may support testing the failover procedure 455 to determine that the backup and recovery procedures are functioning properly. When performing a test failover procedure, the storage appliance 415 may cause execution of each procedure 490 of the failover procedure 455 at the target system. For example, for the resource validation procedure 490-a, the storage appliance may validate that the resource map 450 of the recovery configuration 425. Validation of the resource map 450 may include validating that network interfaces (e.g., network interface 140 of FIG. 1) are present and configured correctly at the target system 485 and validating that the datastore (e.g., storage device 465) are present, configured, and/or accessible at the target system 485. Additionally, for the data transfer procedure 490-b, the storage appliance 415 may initiate transfer of data of the source system 480 to the target system 485. The reconfiguration procedure 490-c may include assigning IP addresses, mac addresses, etc. at the target system 485, and the power on procedure 490-d may include powering on the virtual machines 435 on the target system 485 according to the boot order 445 of the recovery configuration 425. During a failover procedure (e.g., not a test failover procedure), the source virtual machines 420 may be powered off.

The various procedures 490 of the failover procedure 455 may fail for various reasons. Thus, a test failover procedure may be periodically performed to identify and resolve any potential issues, which may limit issues during a failover procedure due to device/system failure. However, performing a full failover procedure 455 may take time and utilize significant processing and bandwidth resources. Further, after a full failover procedure 455, the data and configurations may be cleaned or wiped from the target system 485, which may be wasteful in some cases.

Implementations described herein support failover procedure validation that may utilize a subset of the procedures 490 and a subset of the virtual machines 435-*a*. For example, the storage appliance 415 may cause execution of the subset of procedures 490 for the subset of the virtual machines 435 and may calculate a success metric associated with the full failover procedure 455. Thus, the failover validation procedure, using a subset of the procedures 490, may give a user or entity confidence that a full failover procedure would be successful (or not).

A user may access a user interface 495 supported by or associated with the storage appliance 415 to configure the failover procedure validation. For example, the user may access the user interface 495 to activate failover procedure validation, configure the procedures for resource procedure validation, identify the virtual machines or recovery configuration (e.g., recovery configuration 425) for the failover procedure validation, or the like. If the failover procedure validation is activated, then the failover validation may be performed periodically (e.g., according to a schedule configured by a user) or performed in response to a user activating the procedure. In either case, a test failover procedure is triggered for the virtual machines 420 of the source system 480.

In response to triggering the test failover procedure, the storage appliance may identify the set of failover procedures 490 that are used to perform a full failover procedure on the target system 485, where the full failover procedure may be performed according to the recovery configuration 425. The recovery manager 430 or another component of the storage appliance 415 may select a subset of the test procedures of the set of procedures 490. In some examples, the selected subset includes testing one or more network configurations (e.g., testing aspects of the reconfiguration procedure 490-*c*) for one or more virtual machines and testing a storage capacity of the target system (e.g., aspects of the data transfer procedure 490-*b*). The storage appliance 415 may cause execution, on the target system 485 of the selected subset of test procedures on a subset of virtual machines (e.g., virtual machine 435-*a*) of the set of virtual machines 435. The storage appliance 415 may calculate a success metric associated with the full failover procedure based on execution of the subset of test procedures for the subset of virtual machines 435 at the target system 485. In some examples, the success metric may be calculated based on data received or retrieved from the target system.

As described herein, the recovery configuration 425 for the virtual machines 420 may specify the boot order 445 that is to be followed to support successful recovery of the virtual machines 420 and the application executed by the virtual machines 420. During a full failover procedure 455, the boot order 445 may be followed for powering on the virtual machines 435 at the target system 485. However, for the failover validation procedure described herein, the subset of test procedures 490 may be executed for one or more of the virtual machines in a way that conflicts with the boot order. For example, if the boot order specifies that virtual machine 420-*a* is to be booted up first as virtual machine 435-*a* at the target system 485, the set of test procedures may be executed for virtual machine 420-*b* that corresponds to virtual machine 435-*b* at the target system 485 before the virtual machine 435-*a* is booted (or without booting virtual machine 435-*a*).

In some examples, the subset of test procedures may be identified based on metadata included in the recovery configuration 425. For example, the recovery configuration may specify a number of network information controllers (NICS), number of volumes, sizes of the volumes, or a combination thereof. Accordingly, the procedures selected for test validation may depend on these values relative to a threshold, or based on some other condition.

In some cases, a data hydration procedure may be activated to store data to the target system 485 to support failover validation. That is, the data hydration procedure may be one of the procedures that is used for failover validation, and the data hydration procedure may include aspects related to testing the storage capacity of the target system 485. The hydration procedure may be monitored by the storage appliance to determine a speed and success rate of data transfer to the target system 485. Additionally, during hydration, the remaining storage capacity at the target system 485 may be monitored. In this way, the storage appliance 415 may calculate the success rate of doing data transfer without generating new data on the target system 485. That is, during the data hydration procedure, some data may be moved from the source system 480 to the target system 485. Additionally, during the failover validation, a cloned virtual machine may be created using a hydrated virtual machine, and the network configuration (e.g., aspects of the reconfiguration procedures 490-*c*) may be applied to the cloned virtual machine in order to determine that the network reconfiguration settings may be applied to the virtual machine. After the configuration, the virtual machine may be powered on to determine that the reconfiguration settings are applied.

As described herein, failover may fail for various reasons or errors. In some cases, failure reasons or errors may be allocated to preconfigured lists including terminal failures, serious failures, and information failures. Different weights may be applied to the different lists and used to calculate a success metric. Terminal failure (e.g., 100% failure) may be caused by errors such as permission failures, storage space failures (e.g., not enough storage space determine via the data transfer/hydration procedure), snapshot not being present on the host (e.g., target system 485), or a management utility resources not being present while creating the virtual machines on the target system 485, where the management utility resources may include a data store, a resource pool, etc. Serious failures may be based on errors such as connection flakiness (e.g., determined using the data transfer/hydration procedure), communication problems between a hypervisor host (e.g., hypervisor 475) on the target system 485, datastore array corruption (e.g., error while powering or configuring a virtual machine), or a name being too long. Information failures may include errors such as include role-based access not being installed or version mismatches, network information controls or volume mismatches (e.g., a resource mismatch), or another procedure failure or missing logs associated with a procedure. It should be understood other failure reasons are contemplated within the scope of this disclosure and that the listed reasons may be classified into different or new preconfigured lists within the scope of the present disclosure.

In one example, a success metric may be calculated based on the following formula:

If(# of terminal errors)>0:

success_score=0

Else:

success_score=100−(# of serious errors*5)−(# of informational errors)

As such, different weights are applied to different error types. Thus, using the techniques described herein, a success metric for a full failover procedure may be determined without performing each procedure 490 of the failover procedure. Accordingly, resource utilization (e.g., bandwidth, processing) may be reduced while still informing entities that the backup and recovery procedures of computing systems are functioning properly.

Figure 5:
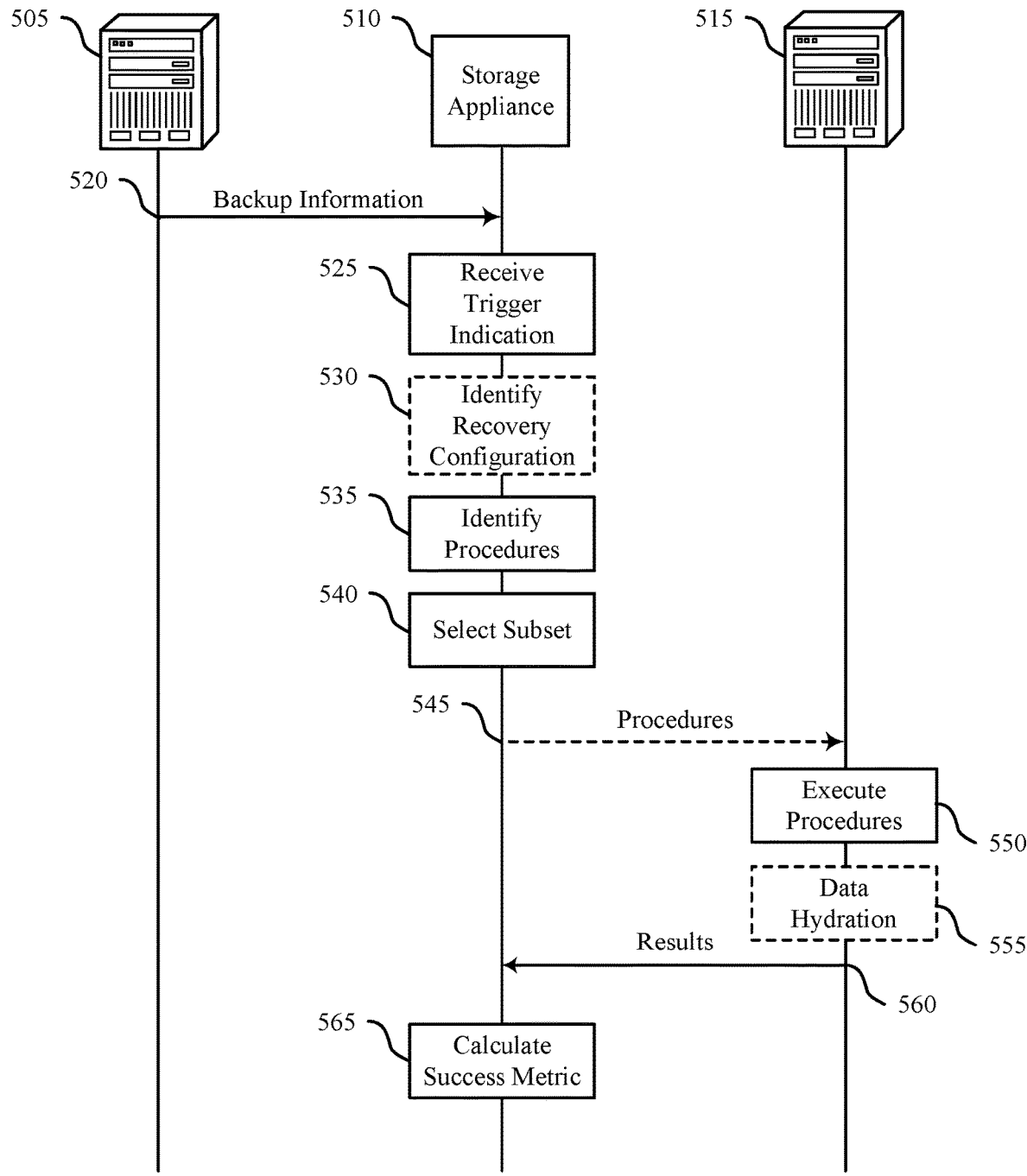
FIG. 5 illustrates an example of a process flow that supports application recovery configuration validation in accordance with aspects of the present disclosure.

FIG. 5 illustrates an example of a process flow 500 that supports application recovery configuration validation in accordance with aspects of the present disclosure. The process flow 500 includes a source system 505, a storage appliance 510, and a target system 515, which may be examples of corresponding devices as described with respect to FIGS. 1 through 4. For example, the source system 505 and the target system 515 may be supported by respective one or more servers as described with respect to FIGS. 1 through 4, and the storage appliance 510 may be supported by one or more servers or another computing system as described with respect to FIGS. 1 through 4. The storage appliance 510 may be configured with a network interface to communicate with the source system 505, the target system 515, and/or other system (e.g., a cloud storage system).

In some examples, the operations illustrated in the process flow 500 may be performed by hardware (e.g., including circuitry, processing blocks, logic components, and other components), code (e.g., software or firmware) executed by a processor, or any combination thereof. Alternative examples of the following may be implemented, where some operations are performed in a different order than described or are not performed at all. In some cases, operations may include additional features not mentioned below, or further steps may be added.

At 520, the storage appliance 510 may receive backup information associated with the source system 505. The backup information may include snapshots of virtual machines of the source system 505, data images, information associated with snapshots or data images, etc. In some examples, the storage appliance 510 may replicate data associated with the backup or data images of the virtual machines to local or cloud storage systems. The snapshots may be generated according to service level agreements associated with each virtual machine supported by the source system 505.

At 525, the storage appliance 510 may receive a trigger indication to perform a test failover procedure for a plurality of virtual machines that are configured to backup data from a source system. The plurality of virtual machines may be examples of the virtual machines supported by the source system 505. The configuration to backup data may be implemented by the snapshots as described herein. The trigger indication may be based on activation of a user interface component of a user interface associated with the storage appliance 510 based on a test failover schedule configuration, or a combination thereof.

At 530, the storage appliance 510 may identify a recovery configuration associated with the plurality of virtual machines. The recovery configuration may contain information about the grouping of the plurality of virtual machines to support one or more applications, a boot order for recovering the plurality of virtual machines, resource mapping information, among other information. Various recovery configurations may be maintained for various virtual machine groupings.

At 535, the storage appliance 510 may identify, based at least in part on receiving the trigger indication, a set of procedures for performing a full failover procedure on the target system 515 based at least in part on the recovery configuration for the plurality of virtual machines.

At 540, the storage appliance 510 may select, for performing the test failover procedure and based at least in part on metadata associated with the plurality of virtual machines, a subset of test procedures of the set of procedures. The subset of test procedures may include testing one or more network configurations for a first virtual machine on the target system 515 and testing storage capacity of the target system 515. In some cases, the subset of test procedures may be selected based on a user selecting one or more of the subset of test procedures at a user interface associated with the storage appliance 510.

At 545, the storage appliance 510 may cause execution, on the target system 515, of the subset of test procedures on a subset of virtual machines of the plurality of virtual machines. In some cases, the subset of virtual machines may be selected based on the recovery configuration and/or based on metadata of the recovery configuration or based on prior test failovers (e.g., executing the subset of procedures for a new subset of virtual machines). Causing execution of the subset of test procedures may include transmitting instructions for the subset of procedures, indicating the subset of procedures, etc.

At 550, the target system 515 may execute the subset of procedures. For example, the target system 515 may test network configurations for the subset of virtual machines, test a storage capacity of the target system, etc. In some cases, one or more permissions are tested at the target system 515, presence of a snapshot is evaluated at the target system 515, or a combination thereof. At 555, the target system 515 may execute a data hydration procedure based on the storage appliance 510 activating the data hydration procedure at the target system 515.

At 560, the storage appliance 510 may identify the results of execution of the subset of test procedures. For example, the storage appliance 510 may monitor logs, errors, progress, or the like associated with execution of the procedure (e.g., including the data hydration procedure).

At 565, the storage appliance 510 may calculate based at least in part on the execution of the subset of test procedures on the subset of virtual machines, a success metric associated with the full failover procedure for the plurality of virtual machines. In some cases, the storage appliance may calculate the success metric based at least in part on predetermined list of terminal test procedures that are executed, a predetermined list of serious test procedures that are executed, and a predetermined list of information test procedures that are executed. In some cases, the success metric is calculated to be zero when one or more terminal procedures fails (e.g., a terminal error occurs). In some cases, a first weight is applied to the list of serious test procedures (e.g., serious errors), and a second weight is applied to the information test procedures (e.g., informational errors). The success metric may be calculated based on the first and second weight.

Figure 6:
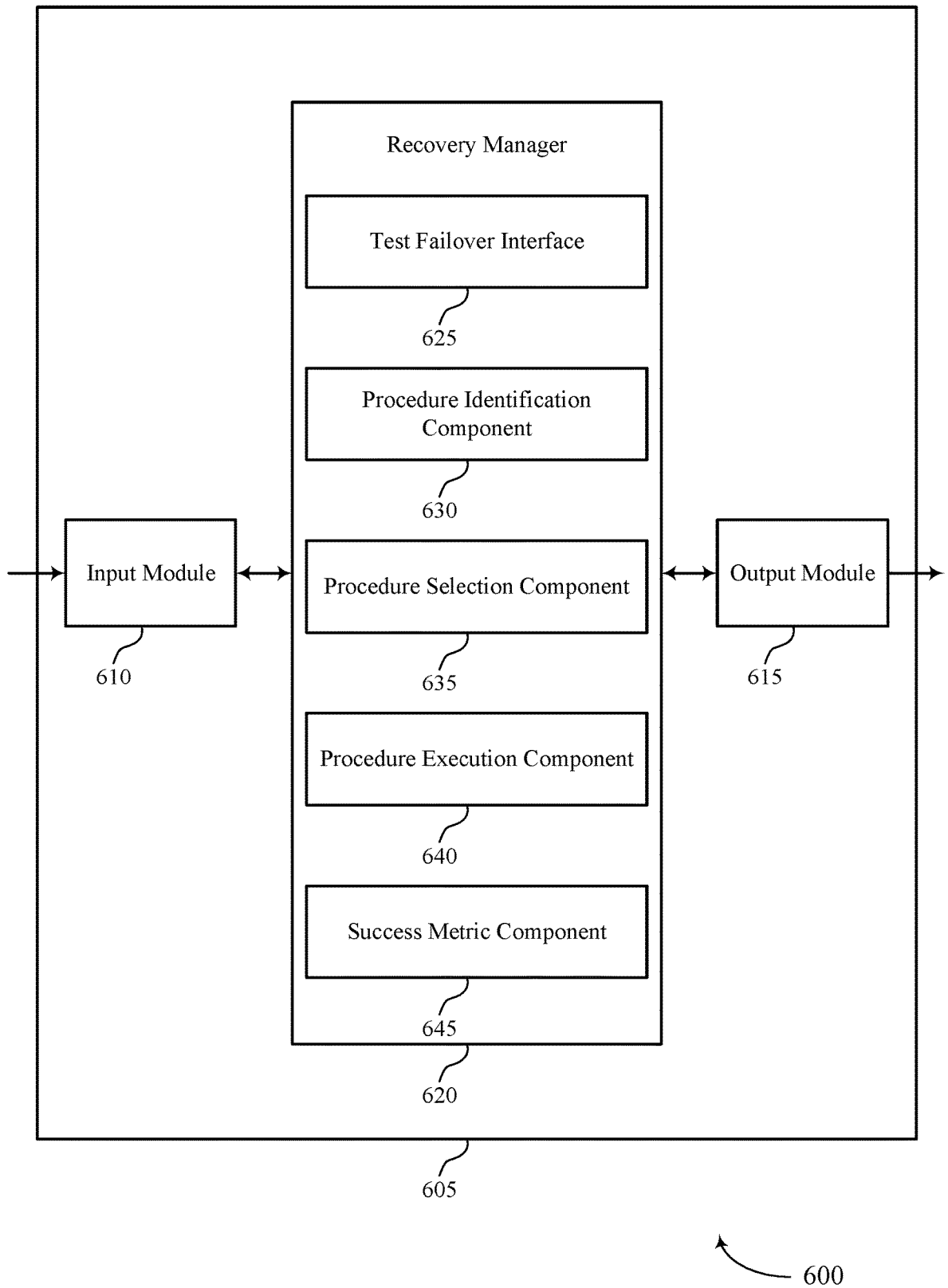
FIG. 6 shows a block diagram of an apparatus that supports application recovery configuration validation in accordance with aspects of the present disclosure.

FIG. 6 shows a block diagram 600 of a device 605 that supports application recovery configuration validation in accordance with aspects of the present disclosure. The device 605 may include an input module 610, an output module 615, and a recovery manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the recovery manager 620 to support application recovery configuration validation. In some cases, the input module 610 may be a component of an network interface 810 as described with reference to FIG. 8.

The output module 615 may manage output signals for the device 605. For example, the output module 615 may receive signals from other components of the device 605, such as the recovery manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an network interface 810 as described with reference to FIG. 8.

For example, the recovery manager 620 may include a test failover interface 625, a procedure identification component 630, a procedure selection component 635, a procedure execution component 640, a success metric component 645, or any combination thereof. In some examples, the recovery manager 620, or various components thereof, may be configured to perform various operations (e.g., receiving, monitoring, transmitting) using or otherwise in cooperation with the input module 610, the output module 615, or both. For example, the recovery manager 620 may receive information from the input module 610, send information to the output module 615, or be integrated in combination with the input module 610, the output module 615, or both to receive information, transmit information, or perform various other operations as described herein.

The recovery manager 620 may support data management in accordance with examples as disclosed herein. The test failover interface 625 may be configured as or otherwise support a means for receiving a trigger indication to perform a test failover procedure for a set of multiple virtual machines that are configured to backup data from a source system. The procedure identification component 630 may be configured as or otherwise support a means for identifying, based on receiving the trigger indication, a set of procedures for performing a full failover procedure on a target system based on a recovery configuration for the set of multiple virtual machines. The procedure selection component 635 may be configured as or otherwise support a means for selecting, for performing the test failover procedure and based on metadata associated with the set of multiple virtual machines, a subset of test procedures of the set of procedures, where the subset of test procedures includes testing one or more network configurations for a first virtual machine on the target system and testing storage capacity of the target system. The procedure execution component 640 may be configured as or otherwise support a means for causing execution, on the target system, of the subset of test procedures on a subset of virtual machines of the set of multiple virtual machines. The success metric component 645 may be configured as or otherwise support a means for calculating, based at least in part on the execution of the subset of test procedures on the subset of virtual machines, a success metric associated with the full failover procedure for the set of multiple virtual machines.

Figure 7:
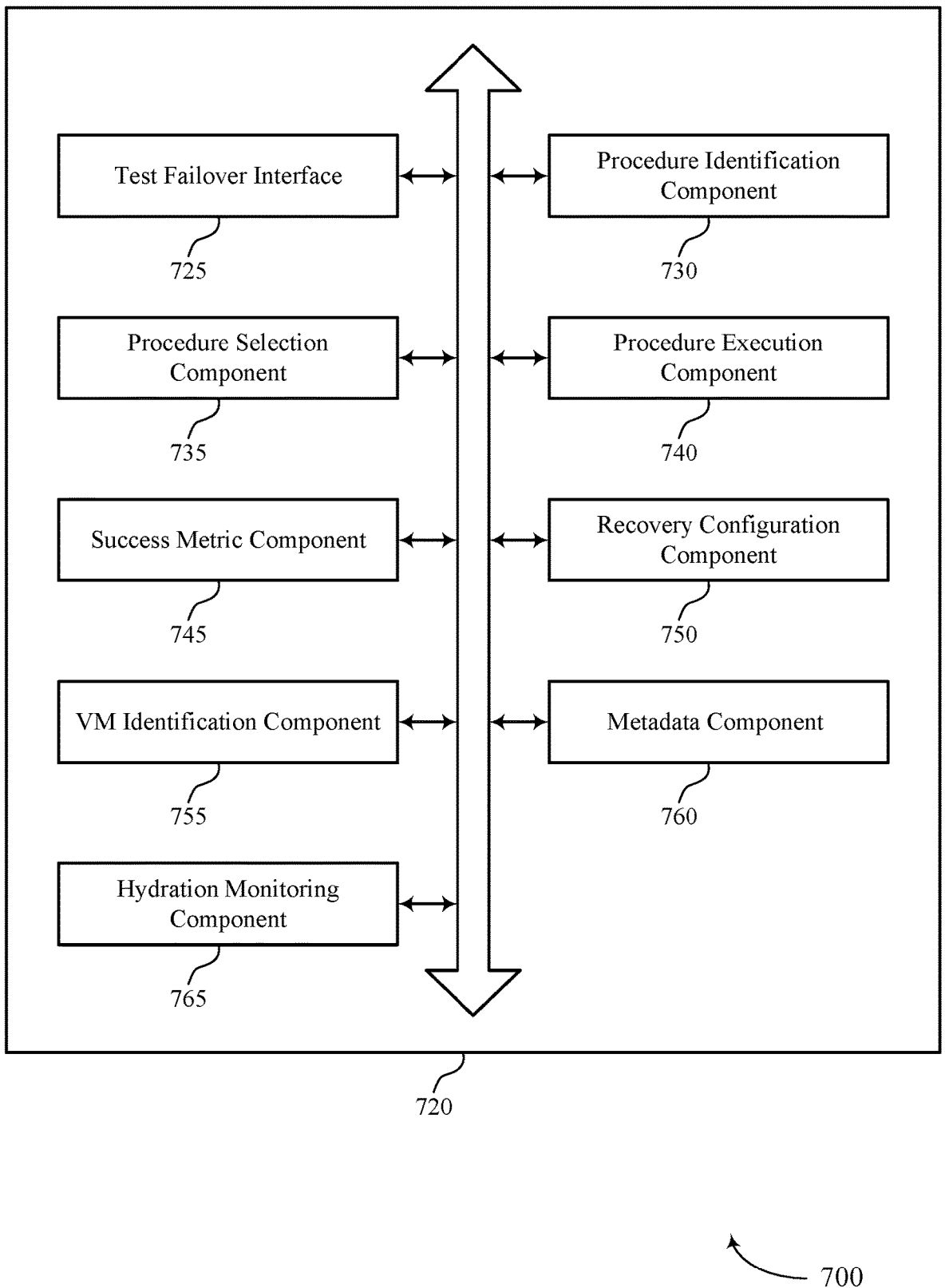
FIG. 7 shows a block diagram of a recovery manager that supports application recovery configuration validation in accordance with aspects of the present disclosure.

FIG. 7 shows a block diagram 700 of a recovery manager 720 that supports application recovery configuration validation in accordance with aspects of the present disclosure. The recovery manager 720 may be an example of aspects of a recovery manager or a recovery manager 620, or both, as described herein. The recovery manager 720, or various components thereof, may be an example of means for performing various aspects of application recovery configuration validation as described herein. For example, the recovery manager 720 may include a test failover interface 725, a procedure identification component 730, a procedure selection component 735, a procedure execution component 740, a success metric component 745, a recovery configuration component 750, a VM identification component 755, a metadata component 760, a hydration monitoring component 765, or any combination thereof. Each of these components may communicate, directly or indirectly, with one another (e.g., via one or more buses).

The recovery manager 720 may support data management in accordance with examples as disclosed herein. The test failover interface 725 may be configured as or otherwise support a means for receiving a trigger indication to perform a test failover procedure for a set of multiple virtual machines that are configured to backup data from a source system. The procedure identification component 730 may be configured as or otherwise support a means for identifying, based on receiving the trigger indication, a set of procedures for performing a full failover procedure on a target system based on a recovery configuration for the set of multiple virtual machines. The procedure selection component 735 may be configured as or otherwise support a means for selecting, for performing the test failover procedure and based on metadata associated with the set of multiple virtual machines, a subset of test procedures of the set of procedures, where the subset of test procedures includes testing one or more network configurations for a first virtual machine on the target system and testing storage capacity of the target system. The procedure execution component 740 may be configured as or otherwise support a means for causing execution, on the target system, of the subset of test procedures on a subset of virtual machines of the set of multiple virtual machines. The success metric component 745 may be configured as or otherwise support a means for calculating, based at least in part on the execution of the subset of test procedures on the subset of virtual machines, a success metric associated with the full failover procedure for the set of multiple virtual machines.

In some examples, the recovery configuration component 750 may be configured as or otherwise support a means for identifying the recovery configuration associated with the set of multiple virtual machines, where the recovery configuration specifies a boot order for booting each machine of the set of multiple virtual machines.

In some examples, the VM identification component 755 may be configured as or otherwise support a means for identifying the subset of virtual machines that conflicts with the boot order of the set of multiple virtual machines specified by the recovery configuration.

In some examples, the metadata component 760 may be configured as or otherwise support a means for identifying the metadata from the recovery configuration, where the subset of test procedures is determined based on the metadata identified from the recovery configuration.

In some examples, the procedure execution component 740 may be configured as or otherwise support a means for activating, at the target system based on receiving the trigger indication, a data hydration procedure to store data at the target system.

In some examples, the hydration monitoring component 765 may be configured as or otherwise support a means for monitoring, at the target system based on activating the data hydration procedure, a hydration speed, a hydration success rate, or both at the target system, where the success metric is calculated based on the hydration speed, the hydration success rate, or both.

In some examples, to support causing execution of the subset of test procedures, the procedure execution component 740 may be configured as or otherwise support a means for testing storage capacity of the target system based on the data hydration procedure.

In some examples, to support causing execution of the subset of test procedures, the procedure execution component 740 may be configured as or otherwise support a means for testing the one or more network configurations on a cloned virtual machine corresponding to the hydrated target system.

In some examples, to support calculating the success metric, the success metric component 745 may be configured as or otherwise support a means for calculating the success metric based on predetermined list of terminal test procedures that are executed, a predetermined list of serious test procedures that are executed, and a predetermined list of information test procedures that are executed.

In some examples, the success metric is zero when one or more of the predetermined list of terminal test procedures fails.

In some examples, a first weight is applied to the predetermined list of serious test procedures and a second weight is applied to the predetermined list of information test procedures. In some examples, the first weight is greater than the second weight.

In some examples, the test failover interface 725 may be configured as or otherwise support a means for receiving, from a user interface system, an indication of selection of one or more of the subset of test procedures, where the trigger indication is received based on receiving the indication.

In some examples, to support causing execution of the subset of test procedures, the procedure execution component 740 may be configured as or otherwise support a means for testing one or more permissions, determining whether a snapshot is present, determining whether resources are present, or a combination thereof.

Figure 8:
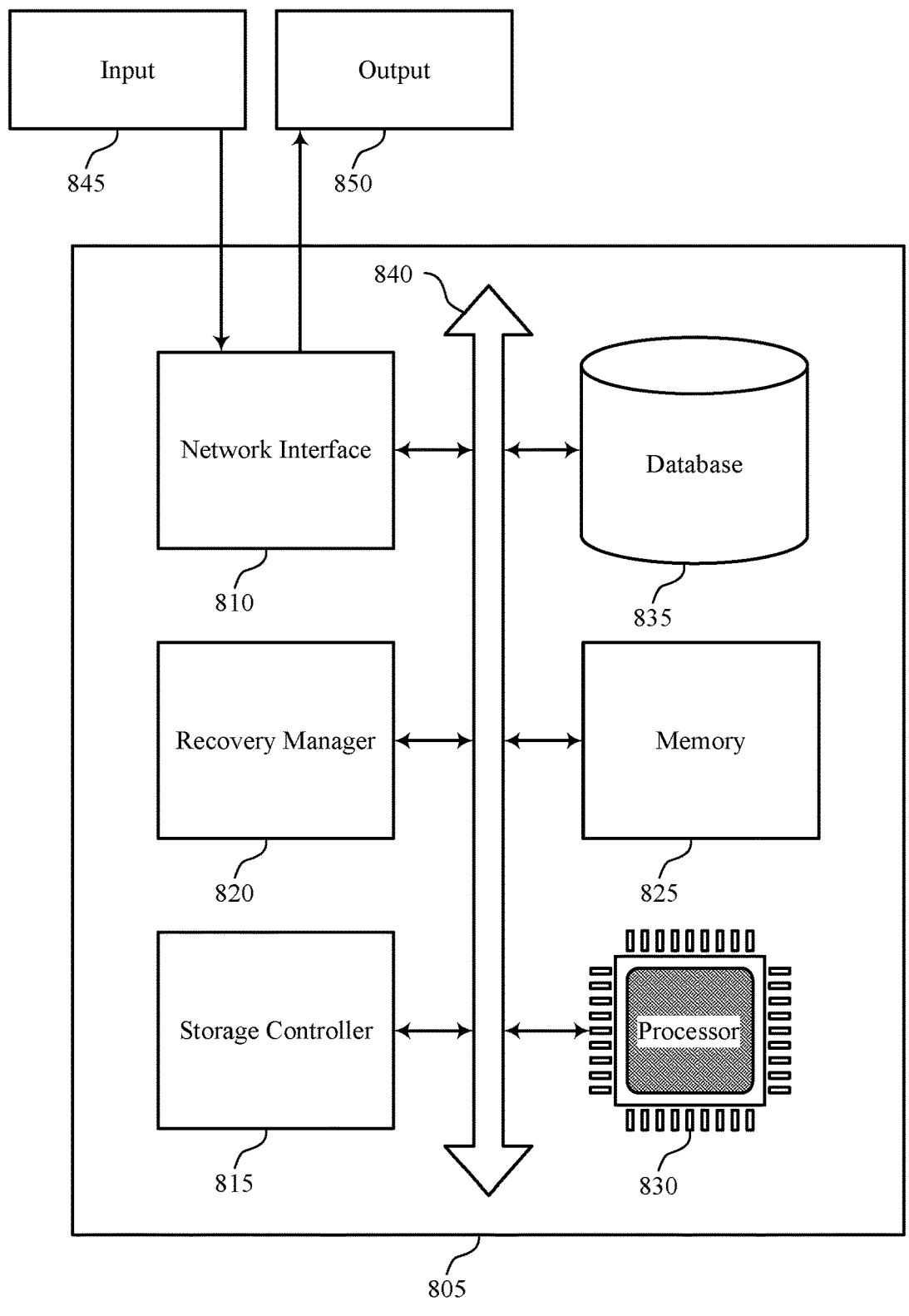
FIG. 8 shows a diagram of a system including a device that supports application recovery configuration validation in accordance with aspects of the present disclosure.

FIG. 8 shows a diagram of a system 800 including a device 805 that supports application recovery configuration validation in accordance with aspects of the present disclosure. The device 805 may be an example of or include the components of a device 605 as described herein. The device 805 may include components for data backup and recovery procedures and communication in support thereof, such as a recovery manager 820, an network interface 810, a storage controller 815, a memory 825, a processor 830, and a database 835. These components may be in electronic communication or otherwise coupled (e.g., operatively, communicatively, functionally, electronically, electrically) via one or more buses (e.g., a bus 840).

The network interface 810 may manage input signals 845 and output signals 850 for the device 805. The network interface 810 may also manage communications with data sources not integrated into the device 805. In some cases, the network interface 810 may represent a physical connection, a wired connection, a wireless connection, or port to an external peripheral. In some cases, the network interface 810 may utilize an operating system such as iOS®, ANDROID®, MS-DOS®, MS-WINDOWS®, OS/2®, UNIX®, LINUX®, or another known operating system. In other cases, the network interface 810 may represent or interact with one or more data sources (e.g., servers, data storage appliances, databases, cloud storage systems) or one or more devices or peripherals such as a modem, a keyboard, a mouse, a touchscreen, or a similar device. In some cases, the network interface 810 may be implemented as part of a processor 830. In some examples, a user may interact with the device 805 via the network interface 810 or via hardware components controlled by the network interface 810.

The storage controller 815 may manage data storage and processing in a database 835. In some cases, a user may interact with the storage controller 815. In other cases, the storage controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting application recovery configuration validation).

The recovery manager 820 may support data management in accordance with examples as disclosed herein. For example, the recovery manager 820 may be configured as or otherwise support a means for receiving a trigger indication to perform a test failover procedure for a set of multiple virtual machines that are configured to backup data from a source system. The recovery manager 820 may be configured as or otherwise support a means for identifying, based on receiving the trigger indication, a set of procedures for performing a full failover procedure on a target system based on a recovery configuration for the set of multiple virtual machines. The recovery manager 820 may be configured as or otherwise support a means for selecting, for performing the test failover procedure and based on metadata associated with the set of multiple virtual machines, a subset of test procedures of the set of procedures, where the subset of test procedures includes testing one or more network configurations for a first virtual machine on the target system and testing storage capacity of the target system. The recovery manager 820 may be configured as or otherwise support a means for causing execution, on the target system, of the subset of test procedures on a subset of virtual machines of the set of multiple virtual machines. The recovery manager 820 may be configured as or otherwise support a means for calculating, based at least in part on the execution of the subset of test procedures on the subset of virtual machines, a success metric associated with the full failover procedure for the set of multiple virtual machines.

By including or configuring the recovery manager 820 in accordance with examples as described herein, the device 805 may support techniques for reduction of resource overhead in testing and evaluating failover recovery procedures.

Figure 9:
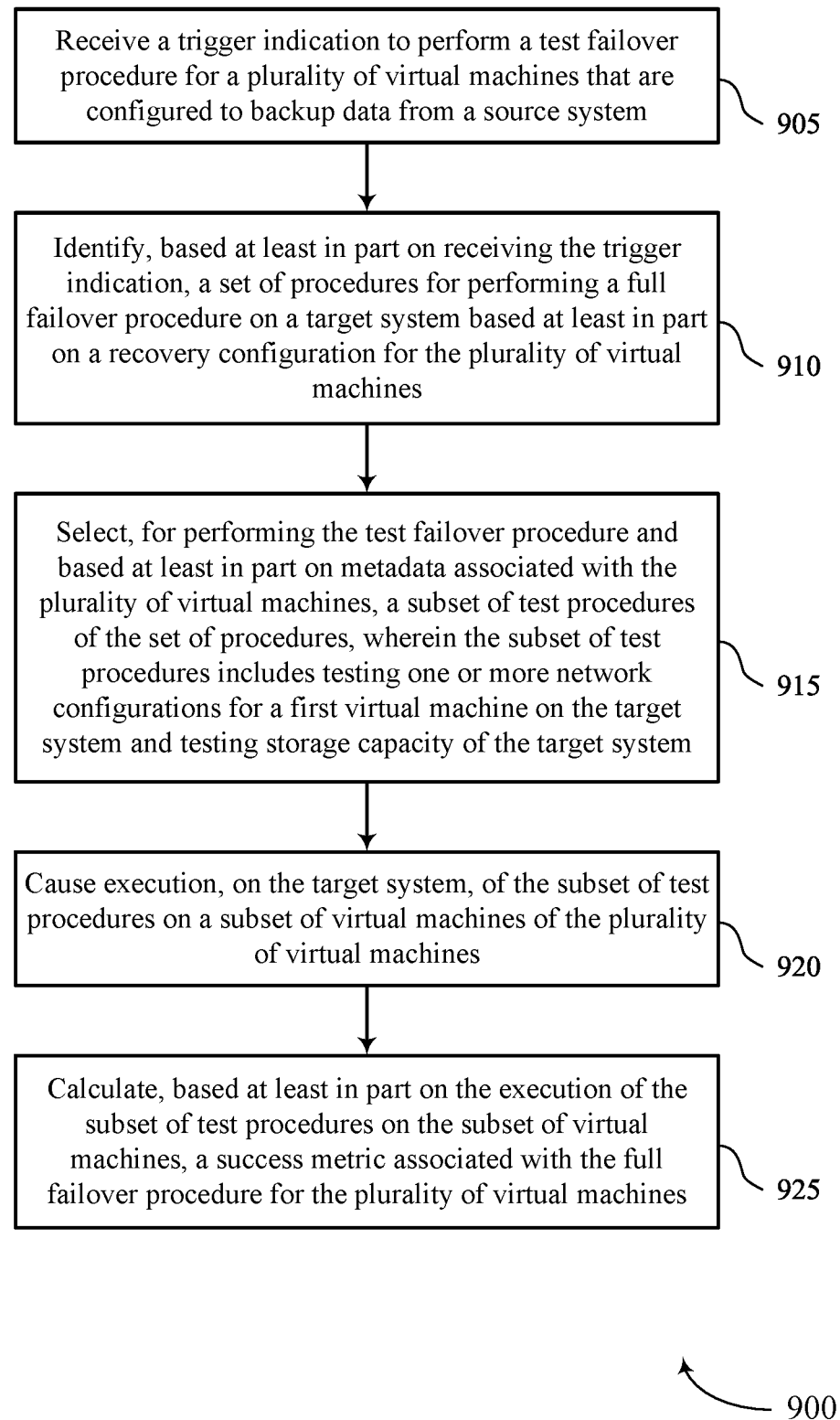
FIGS. 9 through 11 show flowcharts illustrating methods that support application recovery configuration validation in accordance with aspects of the present disclosure.

FIG. 9 shows a flowchart illustrating a method 900 that supports application recovery configuration validation in accordance with aspects of the present disclosure. The operations of the method 900 may be implemented by a storage appliance or its components as described herein. For example, the operations of the method 900 may be performed by a storage appliance as described with reference to FIGS. 1 through 8. In some examples, a storage appliance may execute a set of instructions to control the functional elements of the storage appliance to perform the described functions. Additionally, or alternatively, the storage appliance may perform aspects of the described functions using special-purpose hardware.

At 905, the method may include receiving a trigger indication to perform a test failover procedure for a set of multiple virtual machines that are configured to backup data from a source system. The operations of 905 may be performed in accordance with examples as disclosed herein. In some examples, aspects of the operations of 905 may be performed by a test failover interface 725 as described with reference to FIG. 7.

At 910, the method may include identifying, based on receiving the trigger indication, a set of procedures for performing a full failover procedure on a target system based on a recovery configuration for the set of multiple virtual machines. The operations of 910 may be performed in accordance with examples as disclosed herein. In some examples, aspects of the operations of 910 may be performed by a procedure identification component 730 as described with reference to FIG. 7.

At 915, the method may include selecting, for performing the test failover procedure and based on metadata associated with the set of multiple virtual machines, a subset of test procedures of the set of procedures, where the subset of test procedures includes testing one or more network configurations for a first virtual machine on the target system and testing storage capacity of the target system. The operations of 915 may be performed in accordance with examples as disclosed herein. In some examples, aspects of the operations of 915 may be performed by a procedure selection component 735 as described with reference to FIG. 7.

At 920, the method may include causing execution, on the target system, of the subset of test procedures on a subset of virtual machines of the set of multiple virtual machines. The operations of 920 may be performed in accordance with examples as disclosed herein. In some examples, aspects of the operations of 920 may be performed by a procedure execution component 740 as described with reference to FIG. 7.

At 925, the method may include calculating, based at least in part on the execution of the subset of test procedures on the subset of virtual machines, a success metric associated with the full failover procedure for the set of multiple virtual machines. The operations of 925 may be performed in accordance with examples as disclosed herein. In some examples, aspects of the operations of 925 may be performed by a success metric component 745 as described with reference to FIG. 7.

Figure 10:
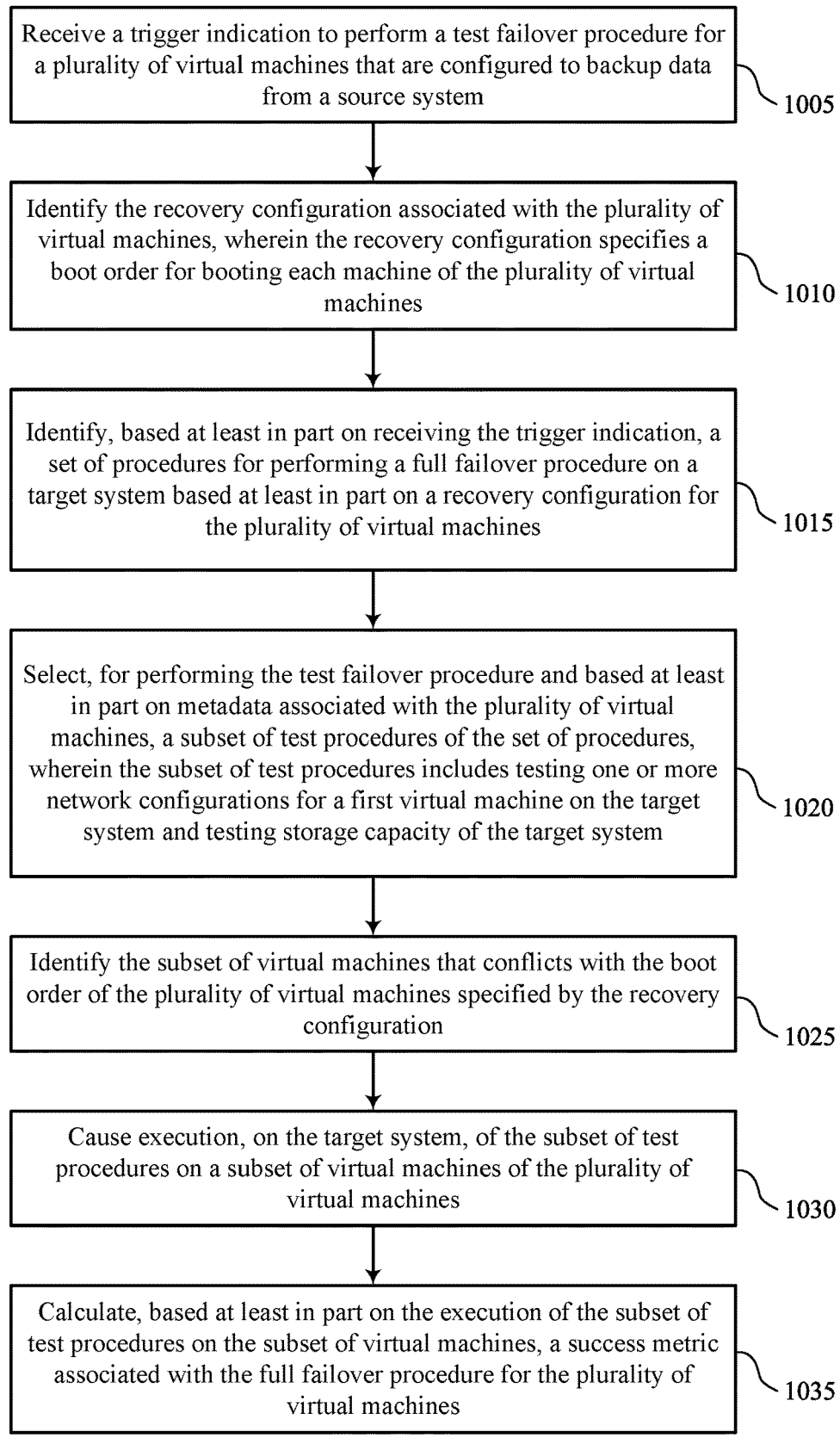

FIG. 10 shows a flowchart illustrating a method 1000 that supports application recovery configuration validation in accordance with aspects of the present disclosure. The operations of the method 1000 may be implemented by a storage appliance or its components as described herein. For example, the operations of the method 1000 may be performed by a storage appliance as described with reference to FIGS. 1 through 8. In some examples, a storage appliance may execute a set of instructions to control the functional elements of the storage appliance to perform the described functions. Additionally, or alternatively, the storage appliance may perform aspects of the described functions using special-purpose hardware.

At 1005, the method may include receiving a trigger indication to perform a test failover procedure for a set of multiple virtual machines that are configured to backup data from a source system. The operations of 1005 may be performed in accordance with examples as disclosed herein. In some examples, aspects of the operations of 1005 may be performed by a test failover interface 725 as described with reference to FIG. 7.

At 1010, the method may include identifying the recovery configuration associated with the set of multiple virtual machines, where the recovery configuration specifies a boot order for booting each machine of the set of multiple virtual machines. The operations of 1010 may be performed in accordance with examples as disclosed herein. In some examples, aspects of the operations of 1010 may be performed by a recovery configuration component 750 as described with reference to FIG. 7.

At 1015, the method may include identifying, based on receiving the trigger indication, a set of procedures for performing a full failover procedure on a target system based on a recovery configuration for the set of multiple virtual machines. The operations of 1015 may be performed in accordance with examples as disclosed herein. In some examples, aspects of the operations of 1015 may be performed by a procedure identification component 730 as described with reference to FIG. 7.

At 1020, the method may include selecting, for performing the test failover procedure and based on metadata associated with the set of multiple virtual machines, a subset of test procedures of the set of procedures, where the subset of test procedures includes testing one or more network configurations for a first virtual machine on the target system and testing storage capacity of the target system. The operations of 1020 may be performed in accordance with examples as disclosed herein. In some examples, aspects of the operations of 1020 may be performed by a procedure selection component 735 as described with reference to FIG. 7.

At 1025, the method may include identifying the subset of virtual machines that conflicts with the boot order of the set of multiple virtual machines specified by the recovery configuration. The operations of 1025 may be performed in accordance with examples as disclosed herein. In some examples, aspects of the operations of 1025 may be performed by a VM identification component 755 as described with reference to FIG. 7.

At 1030, the method may include causing execution, on the target system, of the subset of test procedures on a subset of virtual machines of the set of multiple virtual machines. The operations of 1030 may be performed in accordance with examples as disclosed herein. In some examples, aspects of the operations of 1030 may be performed by a procedure execution component 740 as described with reference to FIG. 7.

At 1035, the method may include calculating, based at least in part on the execution of the subset of test procedures on the subset of virtual machines, a success metric associated with the full failover procedure for the set of multiple virtual machines. The operations of 1035 may be performed in accordance with examples as disclosed herein. In some examples, aspects of the operations of 1035 may be performed by a success metric component 745 as described with reference to FIG. 7.

Figure 11:
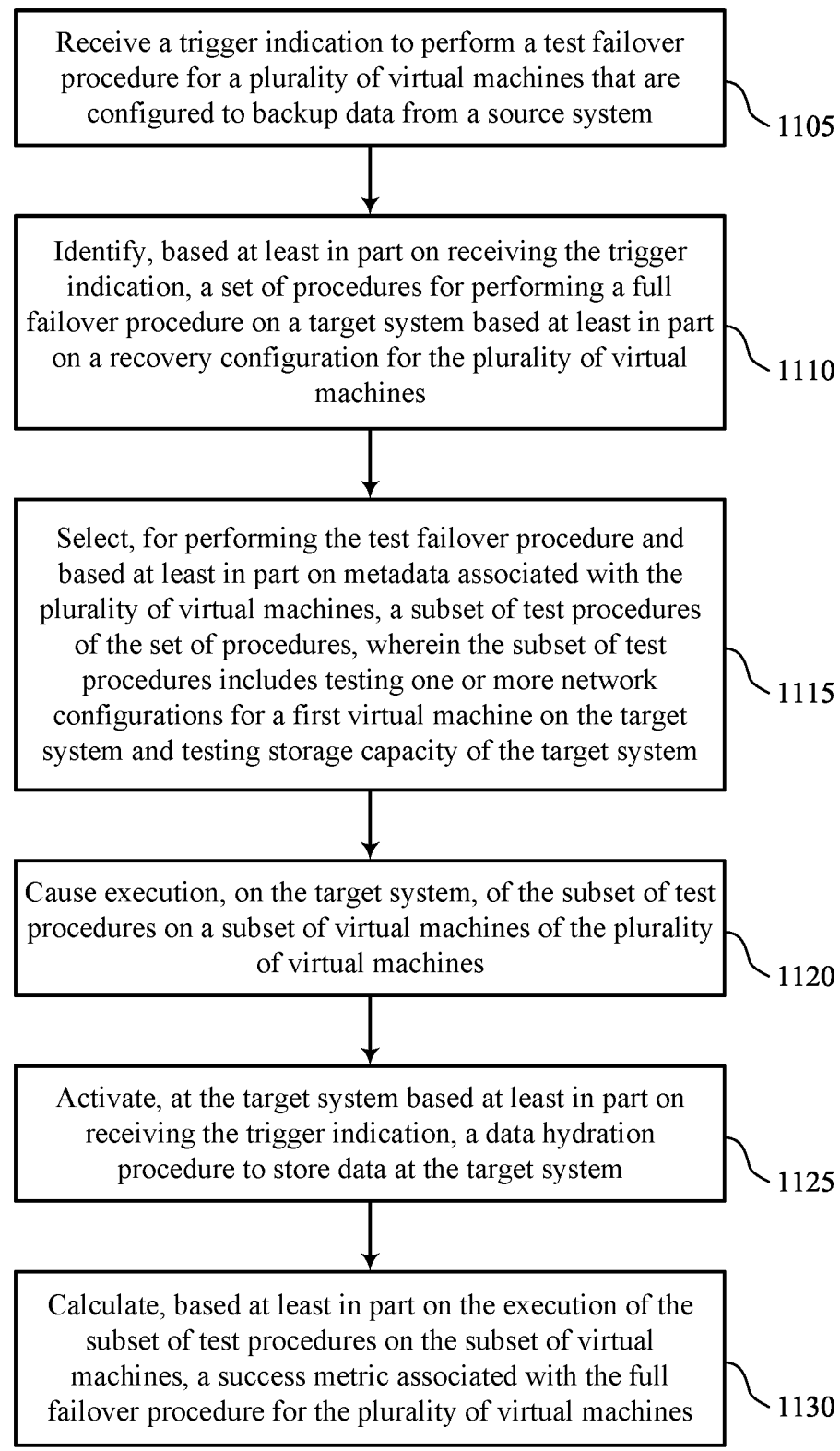

FIG. 11 shows a flowchart illustrating a method 1100 that supports application recovery configuration validation in accordance with aspects of the present disclosure. The operations of the method 1100 may be implemented by a storage appliance or its components as described herein. For example, the operations of the method 1100 may be performed by a storage appliance as described with reference to FIGS. 1 through 8. In some examples, a storage appliance may execute a set of instructions to control the functional elements of the storage appliance to perform the described functions. Additionally, or alternatively, the storage appliance may perform aspects of the described functions using special-purpose hardware.

At 1105, the method may include receiving a trigger indication to perform a test failover procedure for a set of multiple virtual machines that are configured to backup data from a source system. The operations of 1105 may be performed in accordance with examples as disclosed herein. In some examples, aspects of the operations of 1105 may be performed by a test failover interface 725 as described with reference to FIG. 7.

At 1110, the method may include identifying, based on receiving the trigger indication, a set of procedures for performing a full failover procedure on a target system based on a recovery configuration for the set of multiple virtual machines. The operations of 1110 may be performed in accordance with examples as disclosed herein. In some examples, aspects of the operations of 1110 may be performed by a procedure identification component 730 as described with reference to FIG. 7.

At 1115, the method may include selecting, for performing the test failover procedure and based on metadata associated with the set of multiple virtual machines, a subset of test procedures of the set of procedures, where the subset of test procedures includes testing one or more network configurations for a first virtual machine on the target system and testing storage capacity of the target system. The operations of 1115 may be performed in accordance with examples as disclosed herein. In some examples, aspects of the operations of 1115 may be performed by a procedure selection component 735 as described with reference to FIG. 7.

At 1120, the method may include causing execution, on the target system, of the subset of test procedures on a subset of virtual machines of the set of multiple virtual machines. The operations of 1120 may be performed in accordance with examples as disclosed herein. In some examples, aspects of the operations of 1120 may be performed by a procedure execution component 740 as described with reference to FIG. 7.

At 1125, the method may include activating, at the target system based on receiving the trigger indication, a data hydration procedure to store data at the target system. The operations of 1125 may be performed in accordance with examples as disclosed herein. In some examples, aspects of the operations of 1125 may be performed by a procedure execution component 740 as described with reference to FIG. 7.

At 1130, the method may include calculating, based at least in part on the execution of the subset of test procedures on the subset of virtual machines, a success metric associated with the full failover procedure for the set of multiple virtual machines. The operations of 1130 may be performed in accordance with examples as disclosed herein. In some examples, aspects of the operations of 1130 may be performed by a success metric component 745 as described with reference to FIG. 7.

A method for data management is described. The method may include receiving a trigger indication to perform a test failover procedure for a set of multiple virtual machines that are configured to backup data from a source system, identifying, based on receiving the trigger indication, a set of procedures for performing a full failover procedure on a target system based on a recovery configuration for the set of multiple virtual machines, selecting, for performing the test failover procedure and based on metadata associated with the set of multiple virtual machines, a subset of test procedures of the set of procedures, where the subset of test procedures includes testing one or more network configurations for a first virtual machine on the target system and testing storage capacity of the target system, causing execution, on the target system, of the subset of test procedures on a subset of virtual machines of the set of multiple virtual machines, and calculating, based at least in part on the execution of the subset of test procedures on the subset of virtual machines, a success metric associated with the full failover procedure for the set of multiple virtual machines.

An apparatus for data management is described. The apparatus may include a processor, memory coupled with the processor, and instructions stored in the memory. The instructions may be executable by the processor to cause the apparatus to receive a trigger indication to perform a test failover procedure for a set of multiple virtual machines that are configured to backup data from a source system, identify, based on receiving the trigger indication, a set of procedures for performing a full failover procedure on a target system based on a recovery configuration for the set of multiple virtual machines, select, for performing the test failover procedure and based on metadata associated with the set of multiple virtual machines, a subset of test procedures of the set of procedures, where the subset of test procedures includes testing one or more network configurations for a first virtual machine on the target system and testing storage capacity of the target system, cause execution, on the target system, of the subset of test procedures on a subset of virtual machines of the set of multiple virtual machines, and calculate, based at least in part on the execution of the subset of test procedures on the subset of virtual machines, a success metric associated with the full failover procedure for the set of multiple virtual machines.

Another apparatus for data management is described. The apparatus may include means for receiving a trigger indication to perform a test failover procedure for a set of multiple virtual machines that are configured to backup data from a source system, means for identifying, based on receiving the trigger indication, a set of procedures for performing a full failover procedure on a target system based on a recovery configuration for the set of multiple virtual machines, means for selecting, for performing the test failover procedure and based on metadata associated with the set of multiple virtual machines, a subset of test procedures of the set of procedures, where the subset of test procedures includes testing one or more network configurations for a first virtual machine on the target system and testing storage capacity of the target system, means for causing execution, on the target system, of the subset of test procedures on a subset of virtual machines of the set of multiple virtual machines, and means for calculating, based at least in part on the execution of the subset of test procedures on the subset of virtual machines, a success metric associated with the full failover procedure for the set of multiple virtual machines.

A non-transitory computer-readable medium storing code for data management is described. The code may include instructions executable by a processor to receive a trigger indication to perform a test failover procedure for a set of multiple virtual machines that are configured to backup data from a source system, identify, based on receiving the trigger indication, a set of procedures for performing a full failover procedure on a target system based on a recovery configuration for the set of multiple virtual machines, select, for performing the test failover procedure and based on metadata associated with the set of multiple virtual machines, a subset of test procedures of the set of procedures, where the subset of test procedures includes testing one or more network configurations for a first virtual machine on the target system and testing storage capacity of the target system, cause execution, on the target system, of the subset of test procedures on a subset of virtual machines of the set of multiple virtual machines, and calculate, based at least in part on the execution of the subset of test procedures on the subset of virtual machines, a success metric associated with the full failover procedure for the set of multiple virtual machines.

Some examples of the method, apparatuses, and non-transitory computer-readable medium described herein may further include operations, features, means, or instructions for identifying the recovery configuration associated with the set of multiple virtual machines, where the recovery configuration specifies a boot order for booting each machine of the set of multiple virtual machines.

Some examples of the method, apparatuses, and non-transitory computer-readable medium described herein may further include operations, features, means, or instructions for identifying the subset of virtual machines that conflicts with the boot order of the set of multiple virtual machines specified by the recovery configuration.

Some examples of the method, apparatuses, and non-transitory computer-readable medium described herein may further include operations, features, means, or instructions for identifying the metadata from the recovery configuration, where the subset of test procedures may be determined based on the metadata identified from the recovery configuration.

Some examples of the method, apparatuses, and non-transitory computer-readable medium described herein may further include operations, features, means, or instructions for activating, at the target system based on receiving the trigger indication, a data hydration procedure to store data at the target system.

Some examples of the method, apparatuses, and non-transitory computer-readable medium described herein may further include operations, features, means, or instructions for monitoring, at the target system based on activating the data hydration procedure, a hydration speed, a hydration success rate, or both at the target system, where the success metric may be calculated based on the hydration speed, the hydration success rate, or both.

In some examples of the method, apparatuses, and non-transitory computer-readable medium described herein, causing execution of the subset of test procedures may include operations, features, means, or instructions for testing storage capacity of the target system based on the data hydration procedure.

In some examples of the method, apparatuses, and non-transitory computer-readable medium described herein, causing execution of the subset of test procedures may include operations, features, means, or instructions for testing the one or more network configurations on a cloned virtual machine corresponding to the hydrated target system.

In some examples of the method, apparatuses, and non-transitory computer-readable medium described herein, calculating the success metric may include operations, features, means, or instructions for calculating the success metric based on predetermined list of terminal test procedures that may be executed, a predetermined list of serious test procedures that may be executed, and a predetermined list of information test procedures that may be executed.

In some examples of the method, apparatuses, and non-transitory computer-readable medium described herein, the success metric may be zero when one or more of the predetermined list of terminal test procedures fails.

In some examples of the method, apparatuses, and non-transitory computer-readable medium described herein, a first weight may be applied to the predetermined list of serious test procedures and a second weight may be applied to the predetermined list of information test procedures and the first weight may be greater than the second weight.

Some examples of the method, apparatuses, and non-transitory computer-readable medium described herein may further include operations, features, means, or instructions for receiving, from a user interface system, an indication of selection of one or more of the subset of test procedures, where the trigger indication may be received based on receiving the indication.

In some examples of the method, apparatuses, and non-transitory computer-readable medium described herein, causing execution of the subset of test procedures may include operations, features, means, or instructions for testing one or more permissions, determining whether a snapshot may be present, determining whether resources may be present, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data management, comprising:
   receiving a trigger indication to perform a test failover procedure for a plurality of virtual machines that are configured to backup data from a source system;
   identifying, based at least in part on receiving the trigger indication, a set of procedures for performing a full failover procedure on a target system based at least in part on a recovery configuration for the plurality of virtual machines;
   selecting, for performing the test failover procedure and based at least in part on metadata associated with the plurality of virtual machines, a subset of test procedures of the set of procedures, wherein the subset of test procedures includes testing one or more network configurations for a first virtual machine on the target system and testing storage capacity of the target system;
   causing execution, on the target system, of the subset of test procedures on a subset of virtual machines of the plurality of virtual machines; and
   calculating, based at least in part on the execution of the subset of test procedures on the subset of virtual machines, a success metric associated with the full failover procedure for the plurality of virtual machines.

2. The method of claim 1, further comprising:
   identifying the recovery configuration associated with the plurality of virtual machines, wherein the recovery configuration specifies a boot order for booting each machine of the plurality of virtual machines.

3. The method of claim 2, further comprising:
   identifying the subset of virtual machines that conflicts with the boot order of the plurality of virtual machines specified by the recovery configuration.

4. The method of claim 2, further comprising:
identifying the metadata from the recovery configuration, wherein the subset of test procedures is determined based at least in part on the metadata identified from the recovery configuration.

5. The method of claim 1, further comprising:
activating, at the target system based at least in part on receiving the trigger indication, a data hydration procedure to store data at the target system.

6. The method of claim 5, further comprising:
monitoring, at the target system based at least in part on activating the data hydration procedure, a hydration speed, a hydration success rate, or both at the target system, wherein the success metric is calculated based at least in part on the hydration speed, the hydration success rate, or both.

7. The method of claim 5, wherein causing execution of the subset of test procedures comprises:
testing storage capacity of the target system based at least in part on the data hydration procedure.

8. The method of claim 5, wherein causing execution of the subset of test procedures comprises:
testing the one or more network configurations on a cloned virtual machine corresponding to the hydrated target system.

9. The method of claim 1, wherein calculating the success metric comprises:
calculating the success metric based at least in part on predetermined list of terminal test procedures that are executed, a predetermined list of serious test procedures that are executed, and a predetermined list of information test procedures that are executed.

10. The method of claim 9, wherein the success metric is zero when one or more of the predetermined list of terminal test procedures fails.

11. The method of claim 9, wherein a first weight is applied to the predetermined list of serious test procedures, a second weight is applied to the predetermined list of information test procedures, and the first weight is greater than the second weight.

12. The method of claim 1, further comprising:
receiving, from a user interface system, an indication of selection of one or more of the subset of test procedures, wherein the trigger indication is received based at least in part on receiving the indication.

13. The method of claim 1, wherein causing execution of the subset of test procedures comprises:
testing one or more permissions, determining whether a snapshot is present, determining whether resources are present, or a combination thereof.

14. An apparatus for data management, comprising:
a processor;
memory coupled with the processor; and
instructions stored in the memory and executable by the processor to cause the apparatus to:
receive a trigger indication to perform a test failover procedure for a plurality of virtual machines that are configured to backup data from a source system;
identify, based at least in part on receiving the trigger indication, a set of procedures for performing a full failover procedure on a target system based at least in part on a recovery configuration for the plurality of virtual machines;
select, for performing the test failover procedure and based at least in part on metadata associated with the plurality of virtual machines, a subset of test procedures of the set of procedures, wherein the subset of test procedures includes testing one or more network configurations for a first virtual machine on the target system and testing storage capacity of the target system;
cause execution, on the target system, of the subset of test procedures on a subset of virtual machines of the plurality of virtual machines; and
calculate, based at least in part on the execution of the subset of test procedures on the subset of virtual machines, a success metric associated with the full failover procedure for the plurality of virtual machines.

15. The apparatus of claim 14, wherein the instructions are further executable by the processor to cause the apparatus to:
identify the recovery configuration associated with the plurality of virtual machines, wherein the recovery configuration specifies a boot order for booting each machine of the plurality of virtual machines.

16. The apparatus of claim 15, wherein the instructions are further executable by the processor to cause the apparatus to:
identify the subset of virtual machines that conflicts with the boot order of the plurality of virtual machines specified by the recovery configuration.

17. The apparatus of claim 14, wherein the instructions are further executable by the processor to cause the apparatus to:
activate, at the target system based at least in part on receiving the trigger indication, a data hydration procedure to store data at the target system.

18. A non-transitory computer-readable medium storing code for data management, the code comprising instructions executable by a processor to:
receive a trigger indication to perform a test failover procedure for a plurality of virtual machines that are configured to backup data from a source system;
identify, based at least in part on receiving the trigger indication, a set of procedures for performing a full failover procedure on a target system based at least in part on a recovery configuration for the plurality of virtual machines;
select, for performing the test failover procedure and based at least in part on metadata associated with the plurality of virtual machines, a subset of test procedures of the set of procedures, wherein the subset of test procedures includes testing one or more network configurations for a first virtual machine on the target system and testing storage capacity of the target system;
cause execution, on the target system, of the subset of test procedures on a subset of virtual machines of the plurality of virtual machines; and
calculate, based at least in part on the execution of the subset of test procedures on the subset of virtual machines, a success metric associated with the full failover procedure for the plurality of virtual machines.

19. The non-transitory computer-readable medium of claim 18, wherein the instructions are further executable by the processor to:
identify the recovery configuration associated with the plurality of virtual machines, wherein the recovery configuration specifies a boot order for booting each machine of the plurality of virtual machines.

20. The non-transitory computer-readable medium of claim 18, wherein the instructions are further executable by the processor to:

activate, at the target system based at least in part on receiving the trigger indication, a data hydration procedure to store data at the target system.

\* \* \* \* \*